(12) United States Patent
Okabe et al.

(10) Patent No.: US 7,991,215 B2
(45) Date of Patent: Aug. 2, 2011

(54) ELEMENT SPLITTING METHOD, ELEMENT SPLITTING ARITHMETIC DEVICE AND DAMAGE EXTENSION ANALYSIS DEVICE

(75) Inventors: Tomonaga Okabe, Sendai (JP); Hideki Sekine, Sendai (JP); Toshimichi Ogisu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 851 days.

(21) Appl. No.: 11/811,896

(22) Filed: Jun. 12, 2007

(65) Prior Publication Data

US 2007/0292016 A1 Dec. 20, 2007

(30) Foreign Application Priority Data

Jun. 14, 2006 (JP) .................. 2006-164811

(51) Int. Cl.
*G06K 9/00* (2006.01)
*H04N 7/18* (2006.01)
*H04N 9/47* (2006.01)
*G06F 17/10* (2006.01)
*G06F 7/60* (2006.01)
*G06T 15/00* (2006.01)
*G06T 17/00* (2006.01)

(52) U.S. Cl. ............ 382/141; 348/86; 348/125; 700/95; 703/2; 345/419

(58) Field of Classification Search .................. None
See application file for complete search history.

(56) References Cited

U.S. PATENT DOCUMENTS

| | | | |
|---|---|---|---|
| 4,933,889 A * | 6/1990 | Meshkat et al. ............... 716/20 |
| 5,189,626 A * | 2/1993 | Colburn ........................ 700/182 |
| 5,399,854 A | 3/1995 | Dunphy et al. | |
| 5,770,155 A | 6/1998 | Dunphy et al. | |
| 6,208,997 B1 * | 3/2001 | Sigeti et al. .................... 1/1 |
| 6,300,958 B1 * | 10/2001 | Mallet ....................... 345/442 |

(Continued)

FOREIGN PATENT DOCUMENTS

JP 2002-062118 2/2002

(Continued)

OTHER PUBLICATIONS

Peter R. Johnson, et al.; "Element-Splitting for Simulation of Fracture in 3D Solid Continua"; VIII International Conference on Computational Plasticity, 2005; Barcelona.

(Continued)

*Primary Examiner* — Anand Bhatnagar
*Assistant Examiner* — Randolph Chu
(74) *Attorney, Agent, or Firm* — Smith, Gambrell & Russell, LLP (57) ABSTRACT

An element splitting method to be applied to a finite element analysis. The method includes: splitting the object region by a Delaunay triangulation by using the coordinate of the point on the boundary line, as a nodal point; disposing circles not to intersect with one another, in the object region, by a Monte Carlo method, the Lawson's search algorithm and a predetermined function; provisionally moving the center coordinate of the one circle by specifying six circles having minimum intervals from one circle by the Monte Carlo method, to adopt the center coordinate after movement when the value of the degree of dispersion Φ after the movement falls below that before the movement; and splitting the object region by a Delaunay triangulation by using the coordinate of the point on the boundary line and the center coordinate, as nodal points.

17 Claims, 7 Drawing Sheets

U.S. PATENT DOCUMENTS

| | | | |
|---|---|---|---|
| 6,781,582 B1 * | 8/2004 | Van Rens | 345/420 |
| 6,804,635 B1 * | 10/2004 | Dhondt | 703/2 |
| 6,968,299 B1 * | 11/2005 | Bernardini et al. | 703/2 |
| 7,041,960 B2 | 5/2006 | Sato | |
| 7,522,269 B2 | 4/2009 | Ogisu et al. | |
| 7,634,395 B2 * | 12/2009 | Flandrin et al. | 703/10 |
| 7,646,945 B2 | 1/2010 | Jones et al. | |
| 2002/0038201 A1 * | 3/2002 | Balaven et al. | 703/2 |
| 2004/0206893 A1 | 10/2004 | Sato | |
| 2005/0040283 A1 * | 2/2005 | Frazer | 244/12.3 |
| 2006/0045408 A1 | 3/2006 | Jones et al. | |

FOREIGN PATENT DOCUMENTS

| | | |
|---|---|---|
| JP | 2003-295008 | 10/2003 |
| JP | 2003 302331 A | 10/2003 |
| JP | 2003-302331 A | 10/2003 |
| JP | 2004-108890 | 4/2004 |
| JP | 2004-333378 | 11/2004 |
| JP | 2007-333517 | 12/2007 |

OTHER PUBLICATIONS

Denis Steinemann, et al.; "Fast Arbitrary Splitting of Deforming Objects"; Eurographics/ACM Siggraph Symposium on Computer Animation, Aug. 2006.

Petersen, S. B., et al.; "Finite Element Remeshing: A Metal Forming Approach for Quadrilateral Mesh Generation and Refinement" Int J Numer Methods Eng; International Journal fir numerical Methods in Engineering, Apr. 30, 1997.

European Search Report from related European application dated Nov. 26, 2007.

* cited by examiner

$$G_{\mathrm{I}} = \frac{1}{2A} \sum_{i=1}^{5} C_i F_{Z_{n_i}} (w_{d_i} - w_{d'_i})$$

$$G_{\mathrm{II}} = \frac{1}{2A} \sum_{i=1}^{5} C_i F_{X_{n_i}} (u_{d_i} - u_{d'_i})$$

$$G_{\mathrm{III}} = \frac{1}{2A} \sum_{i=1}^{5} C_i F_{Y_{n_i}} (v_{d_i} - v_{d'_i})$$

$$C_1 = C_4 = \frac{w_J}{w_{J-1} + w_J}$$

$$C_3 = C_5 = \frac{w_J}{w_J + w_{J+1}}$$

$$C_2 = 1$$

$$G_{\mathrm{total}} = G_{\mathrm{I}} + G_{\mathrm{II}} + G_{\mathrm{III}}$$

$A$ : SEPARATED AREA $F_X, F_Y, F_Z$ : NODAL FORCE $u, v, w$ : NODAL DISPLACEMENT

FIG. 7A

EXTENSION MODEL

FIG. 7B

ADVANCING DIRECTION OF NODAL POINTS

… … …
ELEMENT SPLITTING METHOD, ELEMENT SPLITTING ARITHMETIC DEVICE AND DAMAGE EXTENSION ANALYSIS DEVICE

CROSS-REFERENCE TO RELATED APPLICATION

The present U.S. patent application claims a priority under the Paris Convention of Japanese patent application No. 2006-164811 filed on Jun. 14, 2006, and is entitled to the benefit thereof for a basis of correction of an incorrect translation.

BACKGROUND OF THE INVENTION

1. Field of the Invention

The present invention relates to an element splitting method to be applied to a finite element analysis, and a damage extension analysis for estimating the extension of damage, such as a crack, a separation or the like, by using the element splitting method.

2. Related Art

JP 2003-302331A describes a method and an apparatus for analyzing the extension of a separation. As described in the Japanese Publication, in the analysis of estimating the extension of damage, such as a crack, a separation or the like, it is necessary to split an analysis object into mesh-shaped elements having nodal points on the damage front of damage according to the extension of the damage. Although the Japanese Publication describes the re-creation of the meshes as the extension of the crack and illustrates a splitting example of actual meshes, the Publication does not describe any mathematical methodology of the splitting.

However, analysis accuracy and a computation time depend on the element splitting method to be applied. Consequently, even if the invention described in the Publication is used, some element splitting methods require substantial time for the preparation of meshes, or have deteriorated estimation accuracy.

That is, a high speed and high accuracy finite element analysis is largely a result of an applied element splitting method.

It is a matter of course that the case of deteriorated estimation accuracy lacks in practicality, and that also the case of requiring substantial time for calculation lacks in practicality.

For example, it is difficult for the conventional element splitting method to instantaneously display the situation of separation extension as a fast-forward moving image.

Moreover, an estimation device of damage extension can be also used as an estimation device of a remaining life, but if a long period is needed for a damage extension calculation of a life to a destroyed state, then a user is made to wait for a long time, which lacks in convenience.

SUMMARY OF THE INVENTION

The present invention was made in view of the aforesaid problems of the prior art. It is an object of the present invention to provide an element splitting method and an element splitting arithmetic device, both capable of enhancing the speed and the accuracy of the finite element analysis.

Moreover, it is another object of the present invention to provide a high speed and high accuracy damage extension analysis device.

In order to solve the problem, according to the first aspect of the invention, the element splitting method to be applied to a finite element analysis, comprises:

(1) a step to dispose an object region in a coordinate system and to determine a coordinate of a point on a boundary line which includes an outline of the object region;

(2) a step to split the object region by a Delaunay triangulation by using the coordinate of the point on the boundary line, determined in the step (1), as a nodal point;

(3) a step to elect an arbitrary coordinate in the coordinate system by a Monte Carlo method and to judge whether the coordinate is within the object region or not;

(4) a step to sequentially suppose a circle having a center at the coordinate judged to be within the object region in the step (3) by determining a radius of the circle based on a predetermined function, and to adopt the supposed circle when the supposed circle does not intersect with any existing circles;

(5) a step to extract one circle out of all of circles adopted in the step (4) by the Monte Carlo method, to specify six circles having minimum intervals from the one circle, to provisionally move the center coordinate of the one circle by the Monte Carlo method, to calculate values of degrees of dispersion of intervals from the one circle before and after the movement, and to adopt the center coordinate after movement when the value of the degree of dispersion after the movement falls below that before the movement; and (6) a step to split the object region by a Delaunay triangulation by using as nodal points, the coordinate of the point on the boundary line determined in the step (1) and the center coordinate adopted through the steps of (2) to (5).

Preferably, the element splitting method further comprises:

(7) a step to extract a nodal point as to a triangular mesh formed in the step (6) by the Monte Carlo method, to provisionally move a coordinate of the extracted nodal point by the Monte Carlo method, to calculate a total sum of values of degrees of un-equilateral triangles before and after movement of the nodal point with respect to all triangles having the extracted nodal point as their vertices, and to adopt the coordinate of the nodal point after the movement when the total sum of the values of the degrees of the un-equilateral triangles after movement falls below that before movement; and (8) a step to split the object region by a Delaunay triangulation by using the coordinate of the point on the boundary line, determined in the step (1), and the coordinate of the nodal point adopted through the steps of (2) to (7), as nodal points.

Preferably, the degrees of dispersion in the step (5) are defined by the following $\Phi$:

$$\phi = \frac{1}{6^2 dr_a^2} \sum_{i=1}^{6} (dr_i - dr_a)^2$$

where $dr_i$ is an interval between a watching circle and an i-th circle of the six circles, and $dr_a$ is an average value of intervals between the watching circle and each of the six circles.

Preferably, the degrees of un-equilateral triangles in the step (7) are defined by the following DTR:

$$DTR = \frac{(a^2 - b^2)^2 + (b^2 - c^2)^2 + (c^2 - a^2)^2}{4S^2}$$

where a, b, and c are lengths of sides of a triangle of each element, and S is an area of the triangle of each element.

The degrees of un-equilateral triangles DTR gives an indication of whether an element is close to an equilateral triangle or not. The figure of the element is an equilateral triangle when the value of DTR is zero. The figure of the element becomes an irregular triangle when the value of DTR is larger. Since the larger the value of DTR is, the figure of the element is apart from an equilateral triangle, here, DTR will be called as the degree of un-equilateral triangle. In the step (7), "the value of the degree of un-equilateral triangle falls below" means the same as "the value of the degree of equilateral triangle goes up".

Preferably, the predetermined function in the step (4) has a correlation of enlarging the radius in the step (4) as a variable becomes larger, the variable being a minimum distance between the coordinate in the step (4) and the boundary line in the step (1).

Preferably, the predetermined function in the step (4) has a correlation of enlarging the radius in the step (4) as a variable becomes larger, the variable being a length of a nearest line segment to the coordinate in the step (4) among line segments each having end points of the adjacent two points on the boundary line in the step (1), the two points determined in the step (1).

Preferably, the judgment in the step (3) is performed by the Lawson's search algorithm.

In accordance with the second aspect of the invention, the element splitting arithmetic device comprises an arithmetic device constituted to enable executing the element splitting method according to the first aspect of the invention.

In accordance with the third aspect of the invention, the damage extension analysis device comprises:

a storage device storing model attribute information and information defining a loading condition to the model;

an initial damage setting unit to set initial damage in the object region;

an element splitting arithmetic unit to execute the element splitting method according to any one of claims 1-7 so that the point on the boundary line in the step (1) also exists on a damage front of the initial damage set by the initial damage setting unit; and a finite element analysis unit to calculate, for the object region split to the elements by the element splitting arithmetic unit, a quantity and a direction of the damage extension on the nodal point on the damage front under the loading condition.

Preferably, the damage extension analysis device further comprises an extension control unit to extend the damage front based on the quantity and the direction of the damage extension, both calculated by the finite element analysis unit, the extension control unit making the element splitting arithmetic unit perform re-splitting of the object region so that the point on the boundary line in the step (1) also exists on the damage front after the extension, and the extension control unit making the finite element analysis unit calculate, for the object region split again by the element splitting arithmetic unit, the quantity and the direction of the damage extension at the nodal point on the damage front after the extension under the loading condition at every extension of the damage.

Preferably, the element splitting arithmetic unit executes the element splitting method according to claim 6 so that, as to the initial damage and a damage extending after that in the step (1) in execution of the element splitting method, an interval between adjacent two points on the boundary line in the step (1) disposed on the outline of the damage and in the inside of the outline may be narrower than an interval between adjacent two points on the boundary line in the step (1) disposed on an outside of the outline of the damage.

Preferably, the interval between the adjacent two points on the boundary line in the step (1) disposed on the outside of the outline of the damage is made to be narrower as the two points is nearer to the damage.

Preferably, the initial damage setting unit sets damage detected by a nondestructive test device to a real thing corresponding to the model as the initial damage in the object region.

Preferably, the damage extension analysis device further comprises: an allowable limit setting unit to set an allowable damage limit; and a remaining life calculation unit to calculate a condition necessary for the extension from the initial damage to the allowable damage limit.

Preferably, the damage extension analysis device further comprises: an image information generation unit to generate image information of the model including damage; and an image display device to perform graphic representation of the model including the damage based on the image information generated by the image information generation unit.

Preferably, the extension control unit makes the image information generation unit generate the image information of the model including the damage after the extension every extension of the damage front.

Preferably, the damage extension analysis device further comprises a reproduction display control unit to make the image display device perform the graphic representation of the model including the damage along an extension process of the damage at a predetermined frame rate on a supposition that the image information corresponding to one state of damage generated by the image information generation unit is set as one frame.

According to the present invention, the advantageous effect of enhancing the speed of the finite element analysis can be obtained.

That is, because a load bearing calculation is performed by the Monte Carlo method, the load of the calculation can be reduced, and consequently the speed of the finite element analysis can be enhanced.

Further, according to the present invention, the advantageous effect of enhancing the accuracy of the finite element analysis can be obtained.

That is, by the second adopting step (5), the six points around the internal one point can be arranged in the six directions where the degree of uniformity is high with respect to the central one point. The arrangement in the six directions where the degree of uniformity is high means here that, if straight lines, each connecting the central one point with the peripheral six points, are supposed, then the angle formed by adjacent two straight lines is made to approach 60 degrees.

After performing the step (5), the object region is split to the triangular elements by the Delaunay triangulation in the step (6), and the number of the triangles commonly having the internal one point becomes six. Because the above-described angles, each formed by the adjacent two straight lines, are severally approximately 60 degrees, each triangular element becomes a form near an equilateral triangle according to its degree of approximation.

Consequently, the object region can be split to the triangular elements, each having the high degree of an equilateral triangle, and consequently the enhancement of the accuracy of the finite element analysis can be achieved.

Furthermore, according to the element splitting method, because of further having the step (7) and the step (8), the degree of an equilateral triangle of each triangular element can be enhanced by the step (7), enhancement of the accuracy of the finite element analysis can be achieved.

DETAILED DESCRIPTION OF THE PREFERRED EMBODIMENTS

Figure 1:
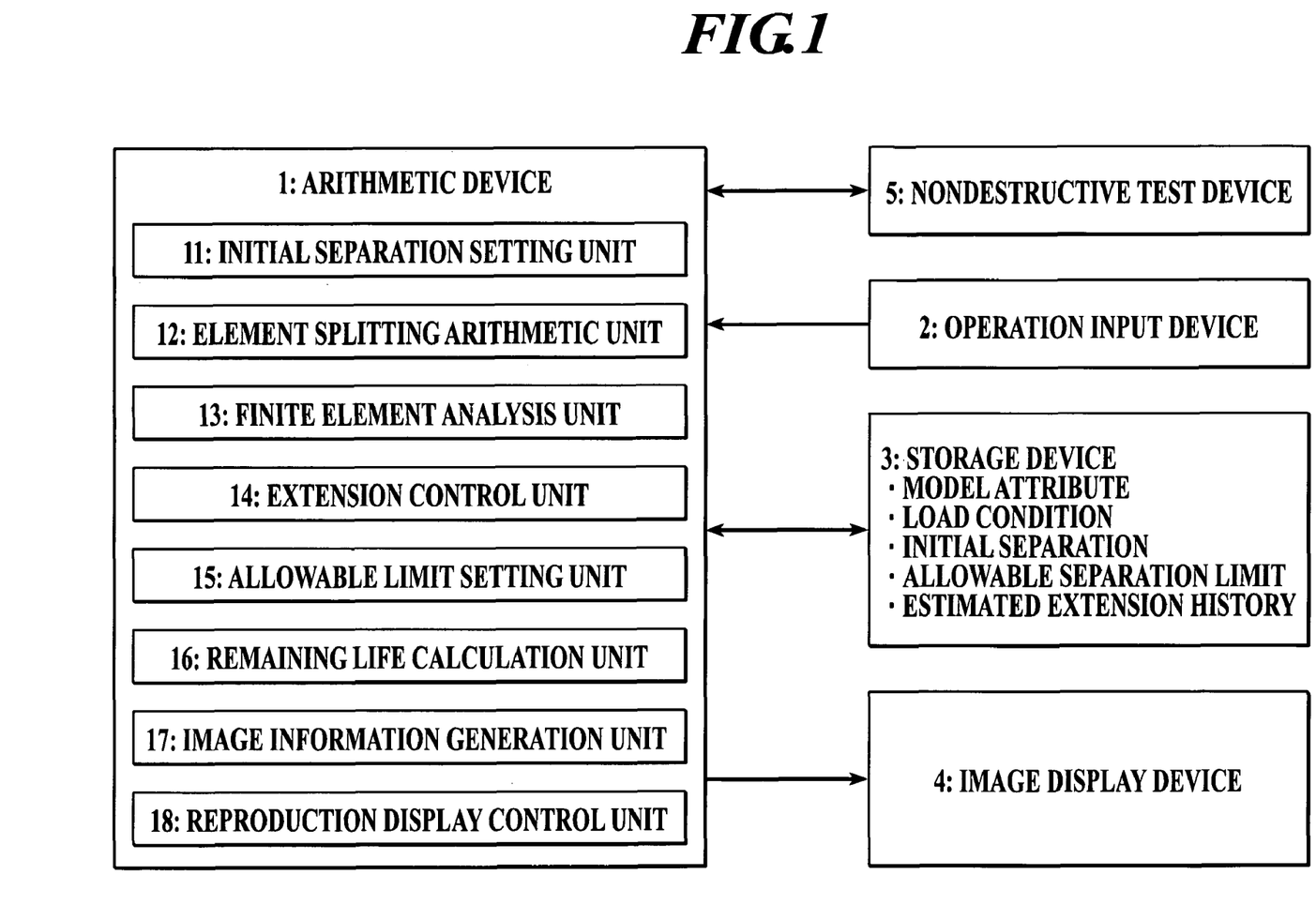
FIG. 1 is a schematic block diagram of a separation extension analysis device according to an embodiment of the present invention.

In the following, an embodiment of the present invention will be described with reference to the attached drawings. The following is an embodiment of the present invention and does not limit the present invention. As for the present embodiment, a separation extension analysis device for analyzing a separation extension of adhesion will be described. The separation extension analysis device of the present embodiment is a device for executing the element splitting method of the present invention, and is the one configured by making the damage extension analysis device of the present invention be specialized to the separation of adhesion. FIG. 1 is a schematic block diagram of the separation extension analysis device according to the embodiment of the present invention.

The separation extension analysis device of the present embodiment is provided with an arithmetic device 1, an operation input device 2, a storage device 3, an image display device 4 and a nondestructive test device 5.

The arithmetic device 1 includes a computer and programs to be executed by the computer. The arithmetic device 1 constitutes an initial separation setting unit 11, an element splitting arithmetic unit 12, a finite element analysis unit 13, an extension control unit 14, an allowable limit setting unit 15, a remaining life calculation unit 16, an image information generation unit 17, a reproduction display control unit 18, and the like. The arithmetic device 1 controls the storage device 3, the image display device 4 and the nondestructive test device 5.

The operation input device 2 inputs an operation instruction caused by a key operation of an operator or the like to the arithmetic device 1.

The storage device 3 stores model attribute information, the information defining a loading condition, the information defining an initial separation, the information defining an allowable separation limit, and estimated extension history information.

The model attribute information and the information defining a loading condition are previously stored in the storage device 3. The model attribute information includes the geometrical information of a model, and the physical property information of a member constituting the model. The member constituting the model includes not only an adhesive but also a member adhered by the adhesive.

The image display device 4 displays an image based on image information output from the arithmetic device 1. The image to be displayed includes the image of the model having a separation besides the guidance of operations.

An arbitrary nondestructive test device 5 may be selected among the existing ones to be used as the nondestructive test device, and, for example, a device using an ultrasonic wave and a device using an optical fiber sensor can be listed. As the device using the optical fiber sensor, the device disclosed in JP-A 2006-164752 (See also U.S. Pat. No. 7,522,269), filed by the same applicant as that of the present application, can be listed.

Figure 2:
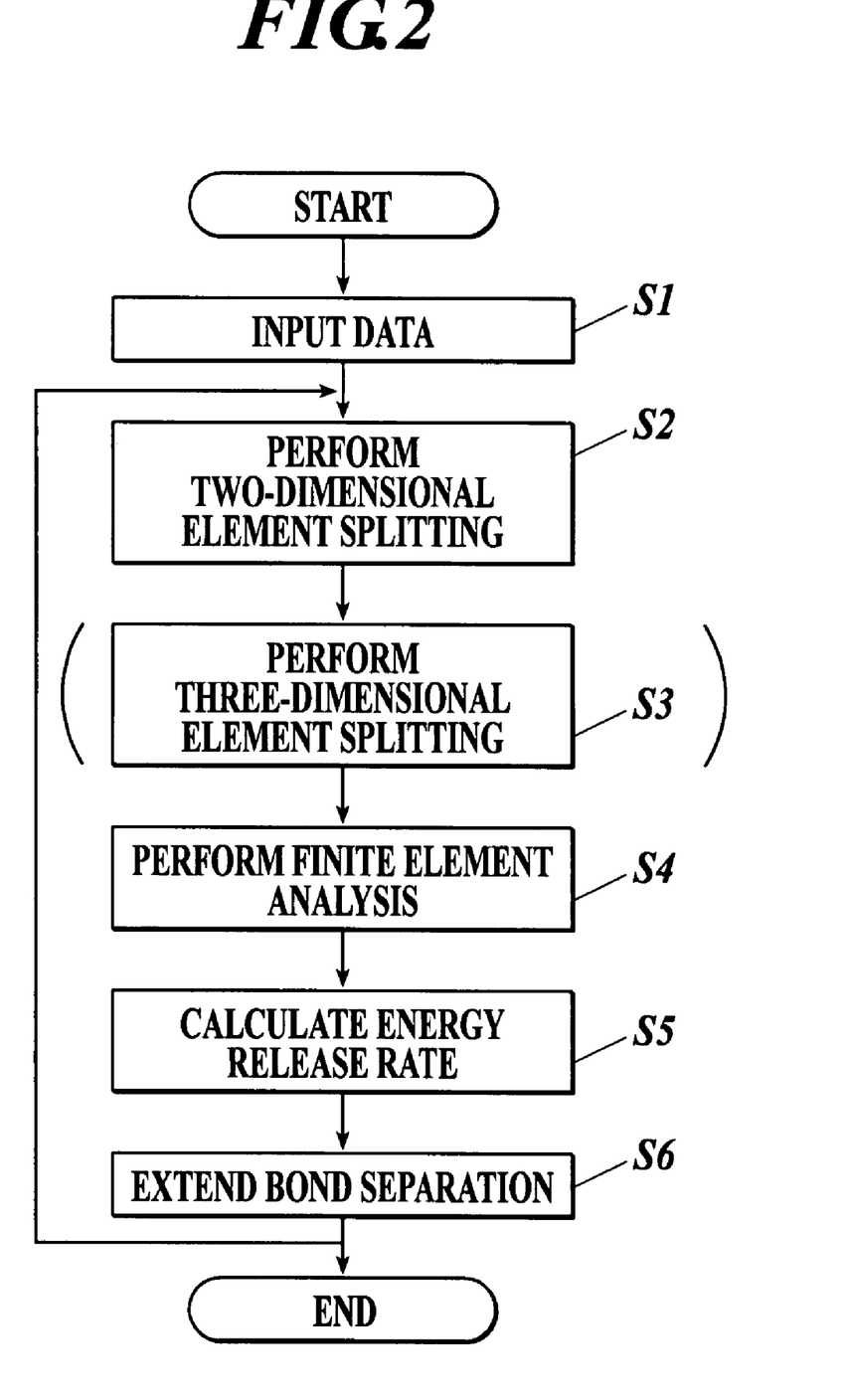
FIG. 2 is a flow chart showing the basic processing contents of the embodiment of the present invention.
Figure 3:
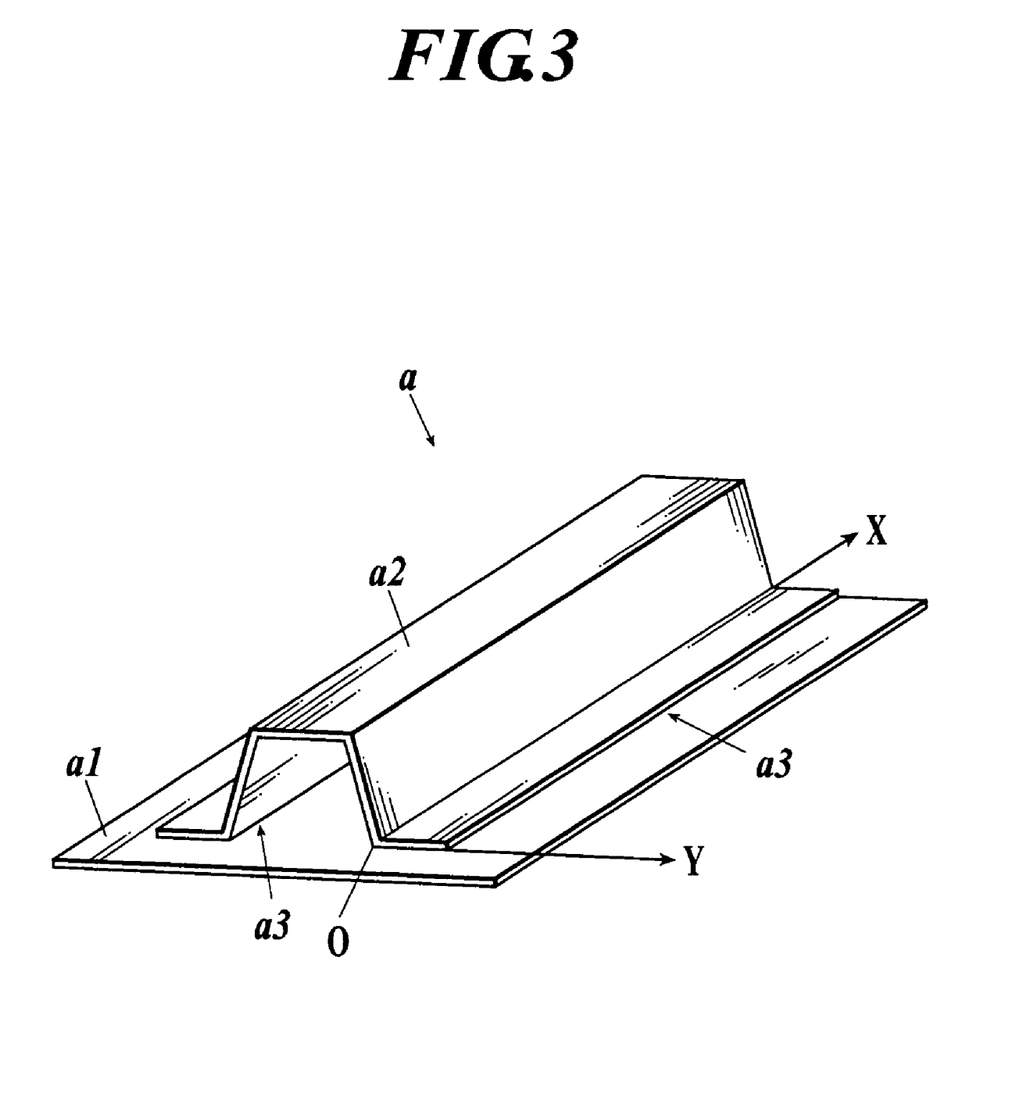
FIG. 3 is a perspective view of the structure of a test object of the embodiment of the present invention.

The processing contents of the separation extension analysis device of the present embodiment are described. FIG. 2 is a flow chart showing the basic processing contents of the present embodiment. In the present embodiment, a structure "a" shown in FIG. 3 is used as a test object. The structure "a" shown in FIG. 3 is composed of an outside plate a1 of a wing of an airplane, a hat-shaped longeron a2, and bonding layers a3 formed of an adhesive adhering and fixing the outside plate a1 to the hat-shaped longeron a2. In the structure "a" like this, a separation starts from an inside corner part of the bonded surface of the hat-shaped longeron a2. One of the inside corner parts of the bonded surface is a point O shown in FIG. 3. The X-Y coordinate including the point O as the origin is shown in the same drawing.

First, as a data input step S1, the information that was detected by the nondestructive test device 5 and indicates the shape of a separation is input into the arithmetic device 1. That is, when the arithmetic device 1 receives the input of a start instruction of a separation extension analysis from the operation input device 2, the arithmetic device 1 controls the nondestructive test device 5 to detect the existence of some separation in the structure "a" and the shape of the separation if any, and requests the nondestructive test device 5 to provide the detected information. The structure "a" is the real thing corresponding to a model the attribute information of which is stored in the storage device 3.

When the arithmetic device 1 receives the detection result from the nondestructive test device 5, the arithmetic device 1 makes the storage device 3 store the detection result as the information defining the initial separation. Moreover, the initial separation setting unit 11 of the arithmetic device 1 sets the detection result from the nondestructive test device 5 as the initial separation. The setting of the initial separation may be performed based on, for example, the separation information input by an operation of the operation input device 2 by an operator besides the detection result of the nondestructive test device 5.

[Element Splitting]

Figure 4A:
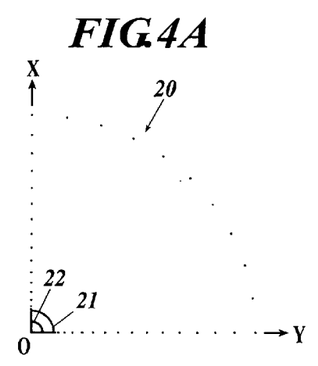
FIGS. 4A, 4B, 4C, 4D, 4E, and 4F are plan views showing a process of splitting processing of the object region of a model in the embodiment of the present invention.

Next, the element splitting arithmetic unit 12 of the arithmetic device 1 performs two-dimensional element splitting as a step S2. The element splitting arithmetic unit 12 performs three-dimensional element splitting as a step S3 as the need arises. In the following, the arithmetic processing contents of the two-dimensional element splitting set as the step S2 is described. The same X-Y coordinate as that in FIG. 3 is shown in FIG. 4A. FIGS. 4A-4F are plan views showing a process of splitting processing to an object region of a model. In the present embodiment, a fan-shaped object region 20 having a central point corresponding to the point O in FIG. 3 is set.

(1) First, the element splitting arithmetic unit 12 of the arithmetic device 1 executes a step of disposing the object region 20 in a certain coordinate system to determine the coordinates of the points on boundary lines including the outline of the object region 20. The X-Y coordinate corresponds to the certain coordinate system here. The outline of the object region 20 indicates the fan-shaped outline mentioned above. Moreover, the damage front 21 of a separation and an arc line 22 are set as the boundary lines.

The points to be used for the element splitting are determined on these boundary lines. As shown in FIG. 4A, the points are determined with narrower intervals on the outline of the separation and in the inside thereof in comparison with those on the outside of the outline of the separation. The outline of the separation corresponds to the fan-shaped outline of the damage front 21 of the separation as the arc around the origin O. The arc line 22 consequently corresponds to the inside of the separation.

As shown in FIG. 4A, the intervals between the points arranged on the outside of the outline of the separation are made to be narrower as the positions of the points become nearer to the separation.

This is in order to split the separation parts highly exerting the influence on the extension of the separation and the regions near the separation parts into finer elements to improve the analysis accuracy.

Figure 4B:
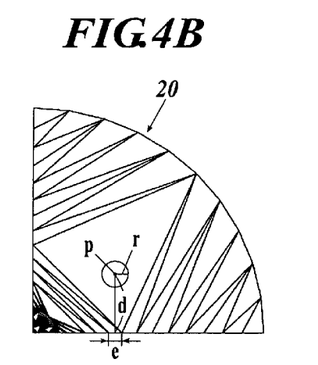

(2) Next, the element splitting arithmetic unit 12 of the arithmetic device 1 executes the step of splitting the object region 20 using the coordinates on the boundary lines that were determined at the step of (1) as nodal points by the Delaunay triangulation. By the present step, as shown in FIG. 4B, the object region 20 is split to triangular elements. In this case, many triangles each having an obtuse angle or elongated triangles are seen as the triangular elements.

(3) Next, the element splitting arithmetic unit 12 of the arithmetic device 1 executes the step of electing arbitrary coordinates in the X-Y coordinate by the Monte Carlo method to judge whether the coordinates are within the object region 20 or not by the Lawson's search algorithm. By performing the Lawson's search algorithm, which is an exploration method of a triangle including nodal points, the one-dimensional (linear) exploration of the elected arbitrary coordinates becomes possible, and the exploration time can be shortened.

(4) Next, the element splitting arithmetic unit 12 of the arithmetic device 1 executes the step of sequentially supposing the circles having the centers of the coordinates judged to be within the object region 20 at the step (3) by determining their radii based on a predetermined function to adopt the supposed circles when the supposed circles do not intersect with the existing circles.

The predetermined function has, for example, a correlation of enlarging a radius r of a circle having a point p shown in FIG. 4B as the center coordinate thereof, as a variable d becomes larger here, where the variable d is the minimum distance d between the circle and a boundary line (corresponding to the boundary line on the Y-axis in this case).

Moreover, the predetermined function has a correlation of enlarging the radius r of the circle as a variable e becomes larger, where the variable e is the length e of the nearest line segment to the center coordinate p of the circle among the line segments having end points of adjacent two points determined by the step (1) on the boundary line.

That is, the element splitting arithmetic unit 12 of the arithmetic device 1 enlarges the radius r as the variable d becomes larger, or as the variable e becomes larger. The supposition of the circle is sequentially performed, and a first circle is adopted. As for the circles at a second order and after that, if a supposed circle does not intersect with the existing circle, the circle is adopted.

Figure 4C:
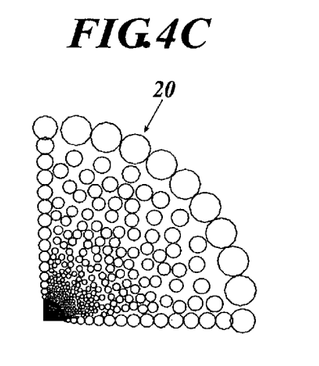

By the execution of the present step, circles of various sizes are arranged as shown in FIG. 4C.

(5) Next, the element splitting arithmetic unit 12 of the arithmetic device 1 executes the step of extracting one circle out of all the circles adopted by the step (4) by the Monte Carlo method, and specifying six circles the intervals of which from the one circle are the smallest. Then, the step provisionally moves the center coordinates of the one circle by the Monte Carlo method, and calculates the value of the degree of dispersion Φ of the intervals from the one circle before and after the movement. Furthermore, if the value of the degree of dispersion Φ after the movement falls below in comparison with that before the movement, the step adopts the center coordinates of the circle after the movement.

The element splitting arithmetic unit 12 of the arithmetic device 1 makes the degree of dispersion Φ be wholly falling by repeating the trial by the Monte Carlo method. Consequently, the circles are arranged as shown in FIG. 4D.

Figure 4D:
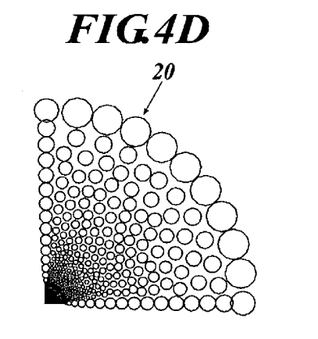

As it is found by the comparison of FIGS. 4C and 4D, the arrangement of the circles is more equalized in FIG. 4D. The reason is that the six points around the one point in the inside can be arranged into the six directions in which the degree of uniformity is high to the central one point by the execution of the present step. The arrangement into the six directions in which the degree of uniformity is high indicates to make the angles formed by adjacent two straight lines approach 60 degrees when the straight lines connecting the one point at the center with the six peripheral points severally are supposed.

Figure 4E:
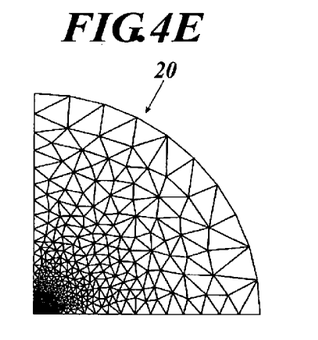

(6) Next, the element splitting arithmetic unit 12 of the arithmetic device 1 executes the step of splitting the object region 20 by the Delaunay triangulation using the coordinates of the points on the boundary lines determined at the step (1) and the coordinates adopted through the steps of (2) to (5) as nodal points. By the execution of the present step, the object region 20 is split to triangular elements as shown in FIG. 4E. At this time, the number of the triangular elements shearing a point in the inside necessarily becomes six. The elements having the higher degree of an equilateral triangle has increased among the triangular elements in comparison with the triangular elements of FIG. 4B. The reason is that, because the aforesaid angles formed by the adjacent two straight lines become nearer to 60 degrees by the execution of the step (5), each triangular element becomes to have the form nearer to the equilateral triangle according to the degree of approximation.

Even if the element splitting is stopped here, triangular meshes split to the triangular elements near to the equilateral triangles can be obtained. But the present embodiment furthermore executes the following step.

(7) Next, the element splitting arithmetic unit 12 of the arithmetic device 1 executes the step of extracting nodal points of the triangular meshes formed at the step (6) by the Monte Carlo method, and provisionally moving the coordinates of the extracted nodal points by the Monte Carlo method. The step further calculates the total sum of the values of the degrees of non-equilateral triangle DTR before and after the movements of the nodal points as to all of the triangles having the extracted nodal points as their vertices, and adopts the coordinates of the nodal points after the movements when the total sum of the values of the degrees of the non-equilateral triangle DTR after the movements falls below that before the movements.

The element splitting arithmetic unit 12 of the arithmetic device 1 repeats the trial by the Monte Carlo method, and thereby makes the degrees of the non-equilateral triangle DTR be wholly falling.

Figure 4F:
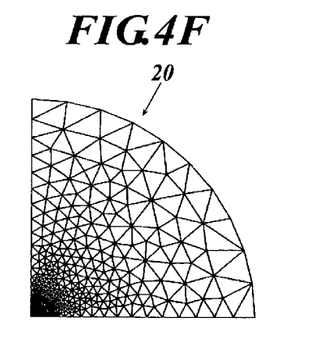

(8) Next, the element splitting arithmetic unit 12 of the arithmetic device 1 executes the step of splitting the object region 20 by the Delaunay triangulation using the coordinates of the points on the boundary lines determined at the step (1), and the coordinates adopted through the aforesaid steps of (2)-(7) as the nodal points. Thereby, as shown in FIG. 4F, the triangular meshes split to the triangular elements each nearer to an equilateral triangle can be obtained.

[Extension Analysis of Adhesive Separation]

Next, the finite element analysis unit 13 of the arithmetic device 1 calculates the extension quantities of the separation of the nodal points on the damage front of the separation 21 and the directions thereof under the loading condition based on the information defining the loading condition which information is stored in the storage device 3 as to the object region 20 split to the elements by the element splitting arithmetic unit 12 (step S4).

The theory to be applied to the separation extension analysis in the present embodiment follows the below. If the extension of the damage of another form is analyzed, an extension theory according to the damage may be applied.

Figure 5:
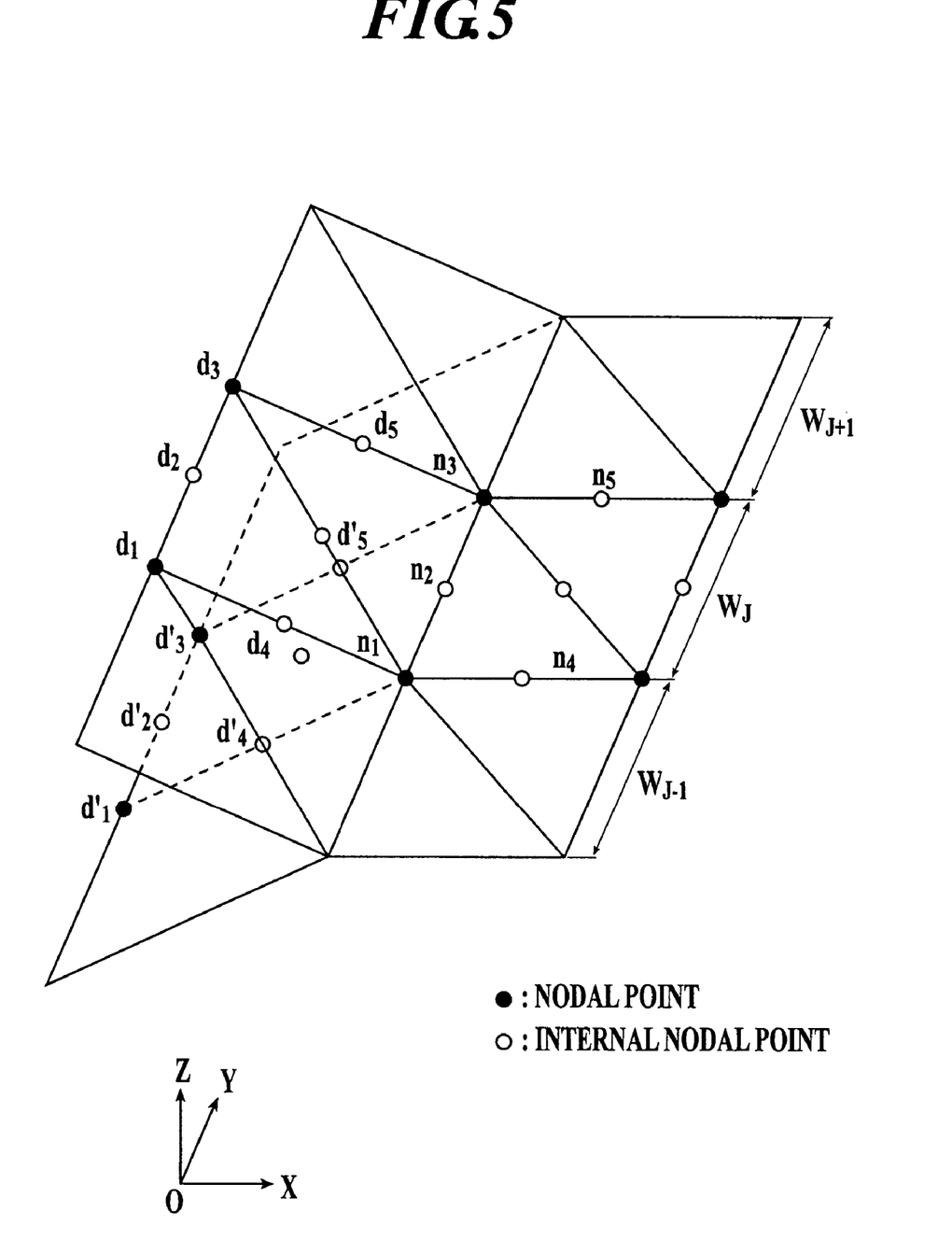
FIG. 5 is a sketch drawing of a separation extension model for defining a virtual crack extension method.
Figure 6:
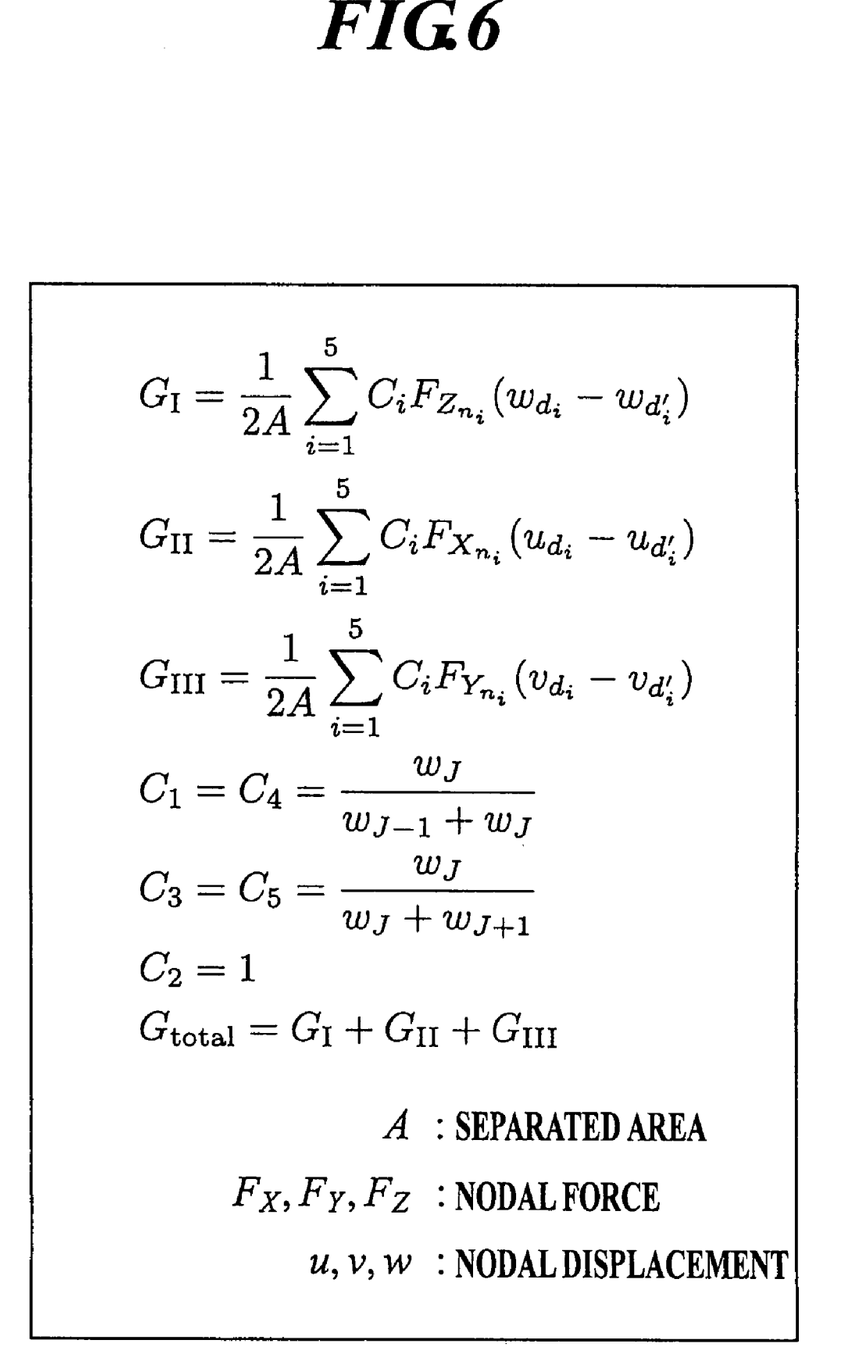
FIG. 6 shows theoretical formulae constituting the virtual crack extension method.
Figure 7A:
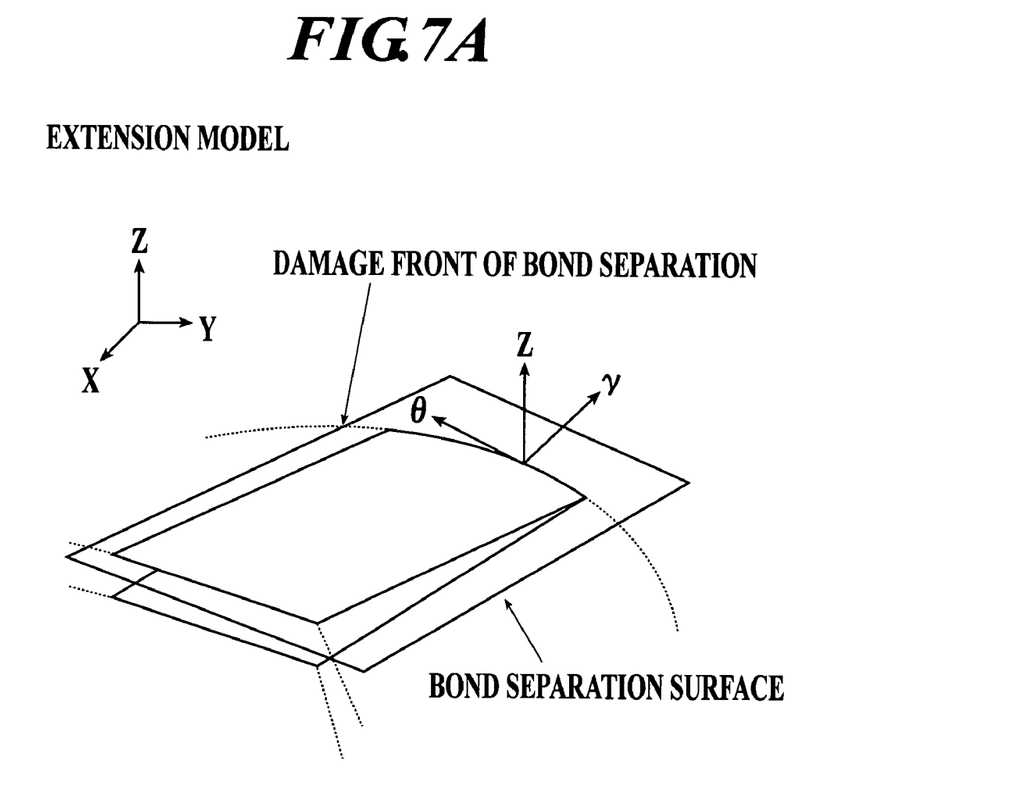
FIG. 7A is a sketch drawing of the separation extension model and FIG. 7B is a plan view of the damage front of a separation showing the directions of a separation extension.
Figure 7B:
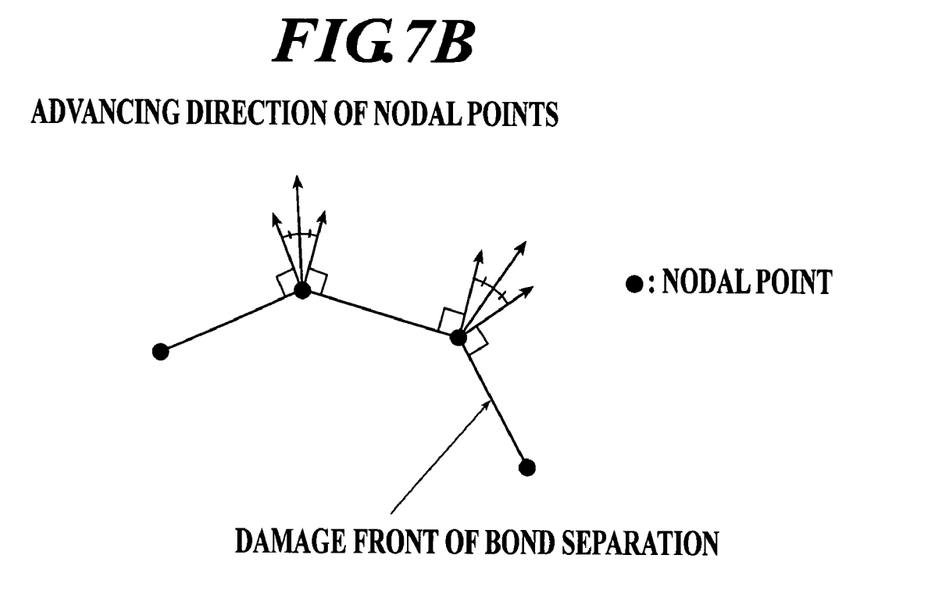

A total energy release rate $G_{total}$ at the damage front of an adhesive separation is used as a fracture mechanics parameter for determining an adhesive separation extension quantity. The present embodiment calculates the total energy release rate Gtotal with the virtual crack extension method. The outline of the virtual crack extension method is shown in FIGS. 5 and 6. The total energy release rate $G_{total}$ is thereby obtained (step S5). The extension quantity of separation is obtained by the Paris law of the following equation.

$$\Delta a = C(\Delta G_{total})^m \Delta N$$

where $\Delta a$ is an adhesive separation extension quantity, N is a load recurrence rate, and C and m are constants obtained by an experiment. Moreover, the extension direction of the adhesive separation is supposed to the normal line direction of the damage front as shown in FIGS. 7A and 7B.

Next, the extension control unit 14 of the arithmetic device 1 extends the damage front of the separation based on the extension quantity of the separation which quantity was calculated by the finite element analysis unit 13 and the direction thereof (step S6), and the extension control unit 14 returns the processing to the step S2.

Consequently, the steps S2-S6 are repeated, and the separation is sequentially extended. The operations at the steps S2-S6 may be set to be executed up to a predetermined recurrence rate and the operations may be ended at the predetermined recurrence rate. Moreover, the operations may be ended after the execution of the remaining life calculation described subsequently.

The allowable limit setting unit 15 of the arithmetic device 1 displays a request of the input of an allowable separation limit on the image display device 4 based on a command from the operation input device 2 in the data input at the step S1, and sets the size and the shape of the separation input from the operation input device 2 correspondingly to the display as the allowable separation limit.

The remaining life calculation unit 16 of the arithmetic device 1 calculates the conditions necessary for the separation to extend up to the allowable separation limit set by the allowable limit setting unit 15 by the execution of the repetition of the steps S2-S6. A condition necessary for the extension up to the allowable separation limit is, for example, the recurrence rate N of a load when a simple repeated load is loaded. The arithmetic device 1 displays the conditions necessary for the extension up to the calculated allowable separation limit as a remaining life on the image display device 4. The expression unit as the remaining life is not limited to the recurrence rate N of the load. If the loading conditions are determined to include a time element, the expression unit may be the time. In case of an airplane, because there exists a standard loading history model determining the transition of standard loading conditions by the flight, the remaining life may be expressed by the flight if the standard loading history model is used as the loading conditions.

On the other hand, the image information generation unit 17 of the arithmetic device 1 generates the image information of a model including an initial separation based on the geometrical information of the model stored in the storage device 3 and the initial separation obtained by the data input at the step S1.

The arithmetic device 1 makes the image display device 4 display the graphic representation of the model including the initial separation based on the image information generated by the image information generation unit 17.

Furthermore, when the operations at the steps S2-S6 are started, the extension control unit 14 makes the image information generation unit 17 generate the image information of the model including the separation after an extension whenever the extension control unit 14 extends the damage front of the separation, and the extension control unit 14 makes the image display device 4 display the graphic representation of the mode including the separation based on the image information generated by the image information generation unit 17.

By the above, the graphic representation of the state of the extension of the separation is performed on the image display device 4 at the speed according to the execution of the operations at the steps S2-S6.

In order to display the state of the extension of the separation at an arbitrary speed, the following configuration is adopted.

That is, the arithmetic device 1 makes the storage device 3 store the image information including the initial separation which information was generated by the image information generation unit 17 and the image information at every extension of the separation as an estimation extension history.

The reproduction display control unit 18 of the arithmetic device 1 reads a series of pieces of image information (moving image files) stored in the storage device 3 as an estimation extension history, and makes the image display device 4 perform the graphic representation of the model including the separation along the extension process of the separation at a predetermined frame rate where the image information corresponding to the state of one separation is supposed to be one frame. The predetermined frame rate may be set to be operable by a signal input from the operation input device 2. The predetermined frame rate is not necessarily to be always constant. It is also possible to configure the frame rate to be capable of being heightened and lowered by the operations through the operation input device 2. Thereby, a user becomes easy to observe the state of the separation extension.

What is claimed is:

1. An element splitting method to be applied to a finite element analysis, comprising:
   (1) a step to dispose an object region in a coordinate system and to determine a coordinate of a point on a boundary line which includes an outline of the object region;
   (2) a step to split the object region by a Delaunay triangulation by using the coordinate of the point on the boundary line, determined in the step (1), as a nodal point;
   (3) a step to elect an arbitrary coordinate in the coordinate system by a Monte Carlo method and to judge whether the coordinate is within the object region or not;
   (4) a step to sequentially suppose a circle having a center at the coordinate judged to be within the object region in the step (3) by determining a radius of the circle based on a predetermined function, and to adopt the supposed circle when the supposed circle does not intersect with any existing circles;
   (5) a step to extract one circle out of all of circles adopted in the step (4) by the Monte Carlo method, to specify six circles having minimum intervals from the one circle, to provisionally move the center coordinate of the one circle by the Monte Carlo method, to calculate values of degrees of dispersion of intervals from the one circle before and after the movement, and to adopt the center coordinate after movement when the value of the degree of dispersion after the movement falls below that before the movement; and (6) a step to split the object region by a Delaunay triangulation by using, as nodal points, the coordinate of the point on the boundary line determined in the step (1) and the center coordinate adopted through the steps of (2) to (5).

2. The element splitting method according to claim 1, further comprising:

(7) a step to extract a nodal point as to a triangular mesh formed in the step (6) by the Monte Carlo method, to provisionally move a coordinate of the extracted nodal point by the Monte Carlo method, to calculate a total sum of values of degrees of un-equilateral triangles before and after movement of the nodal point with respect to all triangles having the extracted nodal point as their vertices, and to adopt the coordinate of the nodal point after the movement when the total sum of the values of the degrees of the un-equilateral triangles after movement falls below that before movement; and (8) a step to split the object region by a Delaunay triangulation by using the coordinate of the point on the boundary line, determined in the step (1), and the coordinate of the nodal point adopted through the steps of (2) to (7), as nodal points.

3. The element splitting method according to claim 1, wherein the degrees of dispersion in the step (5) are defined by the following $\Phi$:

$$\phi = \frac{1}{6^2 dr_a^2} \sum_{i=1}^{6} (dr_i - dr_a)^2$$

where $dr_i$ is an interval between a watching circle and an i-th circle of the six circles, and $dr_a$ is an average value of intervals between the watching circle and each of the six circles.

4. The element splitting method according to claim 2, wherein the degrees of un-equilateral triangles in the step (7) are defined by the following DTR:

$$DTR = \frac{(a^2 - b^2)^2 + (b^2 - c^2)^2 + (c^2 - a^2)^2}{4S^2}$$

where a, b, and c are lengths of sides of a triangle of each element, and S is an area of the triangle of each element.

5. The element splitting method according to claim 1, wherein the predetermined function in the step (4) has a correlation of enlarging the radius in the step (4) as a variable becomes larger, the variable being a minimum distance between the coordinate in the step (4) and the boundary line in the step (1).

6. The element splitting method according to claim 1, wherein the predetermined function in the step (4) has a correlation of enlarging the radius in the step (4) as a variable becomes larger, the variable being a length of a nearest line segment to the coordinate in the step (4) among line segments each having end points of adjacent two points on the boundary line in the step (1), the two points determined in the step (1).

7. The element splitting method according to claim 1, wherein the judgment in the step (3) is performed by the Lawson's search algorithm.

8. An element splitting arithmetic device comprising an arithmetic device constituted to enable executing the element splitting method according to claim 1.

9. A damage extension analysis device comprising:
a storage device storing model attribute information and information defining a loading condition to the model;
an initial damage setting unit to set initial damage in an object region;
an element splitting arithmetic unit to execute the element splitting method according to claim 1 so that the point on the boundary line in the step (1) also exists on a damage front of the initial damage set by the initial damage setting unit; and
a finite element analysis unit to calculate, for the object region split to the elements by the element splitting arithmetic unit, a quantity and a direction of the damage extension on the nodal point on the damage front under the loading condition.

10. The damage extension analysis device according to claim 9, further comprising an extension control unit to extend the damage front based on the quantity and the direction of the damage extension, both calculated by the finite element analysis unit, the extension control unit making the element splitting arithmetic unit perform re-splitting of the object region so that the point on the boundary line in the step (1) also exists on the damage front after the extension, and the extension control unit making the finite element analysis unit calculate, for the object region split again by the element splitting arithmetic unit, the quantity and the direction of the damage extension at the nodal point on the damage front after the extension under the loading condition at every extension of the damage.

11. The damage extension analysis device according to claim 9, wherein the element splitting arithmetic unit executes the element splitting method so that, as to the initial damage and a damage extending after that in the step (1) in execution of the element splitting method, an interval between adjacent two points on the boundary line in the step (1) disposed on the outline of the damage and in the inside of the outline may be narrower than an interval between adjacent two points on the boundary line in the step (1) disposed on an outside of the outline of the damage.

12. The damage extension analysis device according to claim 11, wherein the interval between the adjacent two points on the boundary line in the step (1) disposed on the outside of the outline of the damage is made to be narrower as the two points are nearer to the damage.

13. The damage extension analysis device according to claim 9, wherein the initial damage setting unit sets damage to the model, as the initial damage in the object region, corresponding to damage to a real thing detected by a nondestructive test device.

14. The damage extension analysis device according to claim 9, further comprising:
an allowable limit setting unit to set an allowable damage limit; and
a remaining life calculation unit to calculate a condition necessary for the extension from the initial damage to the allowable damage limit.

15. The damage extension analysis device according to claim 9, further comprising:

an image information generation unit to generate image information of the model including damage; and an image display device to perform graphic representation of the model including the damage based on the image information generated by the image information generation unit.

16. The damage extension analysis device according to claim 15, further comprising an extension control unit to extend the damage front based on the quantity and the direction of the damage extension, wherein the extension control unit makes the image information generation unit generate the image information of the model including the damage after every extension of the damage front.

17. The damage extension analysis device according to claim 15, further comprising a reproduction display control unit to make the image display device perform the graphic representation of the model including the damage along an extension process of the damage at a predetermined frame rate on a supposition that the image information corresponding to one state of damage generated by the image information generation unit is set as one frame.

* * * * *